Patented Apr. 16, 1940

2,197,723

UNITED STATES PATENT OFFICE

2,197,723

RESINOUS ACID-AMINE CONDENSATION PRODUCT AND PROCESS OF MAKING THE SAME

Almon G. Hovey, Pleasant Ridge, and Theodore S. Hodgins, Royal Oak, Mich., assignors to Reichhold Chemicals, Inc., formerly Beck, Koller & Company, Inc., Detroit, Mich.

No Drawing. Application December 15, 1938, Serial No. 245,984

12 Claims. (Cl. 260—78)

The invention relates broadly to improvements in resinous acid-amine condensation products and to the process of making the same, the present application being a continuation-in-part of our co-pending application Serial No. 147,569, filed June 10, 1937, now Patent No. 2,153,801, dated April 11, 1939, the disclosure of which is hereby incorporated by reference as part of the disclosure of the present application.

In the manufacture of alkyd resins it has been proposed to substitute the polyhydric alcohols, in whole or in part by triethanolamine, which is an hydroxylated amine, and to react such hydroxylated amine with an organic carboxylic acid. In such reaction, however, the triethanolamine acts in a manner similar to glycerol and other polyhydric alcohols customarily employed in the manufacture of alkyd resins, owing to the presence of the hydroxyl groups which react with the organic acid in the well known manner.

It has also been proposed to employ certain organic amines in minor proportion as modifying agents in connection with various other ingredients employed in the manufacture of synthetic products. Furthermore various polyamines have been reacted with certain organic acids.

We have discovered that valuable resinous condensation products having distinctive properties may be produced by fusing together hydroxy organic acids and non-hydroxylated organic monoamines wherein the said acids and amines constitute the sole or at least the principal reacting ingredients.

The claims of the present application are directed specifically to the preparation of resins from lactic acid and organic mono-amines such as isobutylamine, pyridine, dioctylamine and aniline, such resins being found to be commercially useful for various purposes.

The following specific examples are given by way of illustration and not by way of limitation.

Example 1

One mol of lactic acid was reacted with one mol of isobutylamine for 25 minutes at 80–205° C. without much foaming. The resulting dark red resin had a cure time of 17 seconds at 200° C. on the hot plate. The resin was insoluble in water and mineral spirits and soluble in acetone, alcohol and toluol. A 60% solution of the resin in alcohol had a Gardner-Holdt viscosity at 25° C. of less than A and a Hellige-Klett color of 9.

Example 2

One mol of lactic acid was heated with one mol of pyridine for 10 minutes at 105–160° C. without foaming, yielding a pale straw colored resin having a cure time of 8 seconds at 200° C. on the hot plate. The resin was soluble in water, acetone and alcohol; insoluble in toluol and mineral spirits.

Example 3

One mol of lactic acid was reacted with one mol of dioctylamine for 25 minutes at 150–270° C., resulting in a pale straw colored resin having a cure time of 20–22 seconds on the hot plate at 200° C. This product was insoluble in water; soluble in acetone, alcohol, toluol and mineral spirits.

Example 4

One mol of lactic acid was reacted with one mol of aniline for 12 minutes at 80–210° C. without foaming, producing a light yellow resin having a cure time of 15 seconds on the hot plate at 200° C. The resin is slightly soluble in water and toluol; soluble in acetone and alcohol and insoluble in mineral spirits.

We claim:

1. A resinous reaction product formed by fusing together lactic acid and an organic mono-amine selected from a group consisting of isobutylamine, pyridine, dioctylamine and aniline, said acid and said amine comprising the principal reacting ingredients.

2. A process which comprises fusing together lactic acid and an organic mono-amine selected from a group consisting of isobutylamine, pyridine, dioctylamine and aniline until a resinous condensation product is obtained, said acid and said amine comprising the principal reacting ingredients.

3. A resinous reaction product formed by fusing together equimolecular quantities of lactic acid and isobutylamine, said acid and amine comprising the principal reacting ingredients, said product being dark red in color having a cure time of about 17 seconds at 200° C. on a hot plate, and being soluble in acetone, alcohol and toluol.

4. An alcohol solution of the resin defined in claim 3, having a Gardner-Holdt viscosity at 25° C. of less than A and a Hellige-Klett color of 9.

5. A process of producing a resinous condensation product which comprises fusing together one mol of lactic acid and one mol of isobutylamine for about 25 minutes at 20–205° C., said acid and said amine comprising the principal reacting ingredients.

6. A pale straw-colored resin formed by heating together equimolecular quantities of lactic acid and pyridine, as the principal reacting ingredients.

7. A process of producing a resinous product which comprises heating together one mol of lactic acid and one mol of pyridine for about 10 minutes at 105–160° C., said acid and said amine constituting the principal reacting ingredients.

8. A light yellow resin formed by fusing together equimolecular quantities of lactic acid and aniline, as the principal reacting ingredients, said resin having a cure time of 15 seconds on the hot plate at 200° C., and being soluble in acetone and alcohol, insoluble in mineral spirits and slightly soluble in water and toluol.

9. A process of producing a resin which comprises reacting one mol of lactic acid with one mol of aniline for about 12 minutes at 80–210° C. without foaming, said acid and said amine constituting the principal reacting ingredients.

10. A resin formed by heating together lactic acid and isobutylamine, as the principal reacting ingredients.

11. A resin formed by heating together lactic acid and pyridine, as the principal reacting ingredients.

12. A resin formed by heating together lactic acid and aniline, as the principal reacting ingredients.

ALMON G. HOVEY.
THEODORE S. HODGINS.